3,449,451
CATALYTIC PRODUCTION OF GRIGNARD REAGENTS
Peter J. Senatore, Baldwin, N.Y., assignor to Chas. Pfizer & Co., Inc., New York, N.Y., a corporation of Delaware
No Drawing. Filed Oct. 4, 1965, Ser. No. 492,894
Int. Cl. C07c *17/00, 7/22;* C07f *3/02*
U.S. Cl. 260—665                                6 Claims

ABSTRACT OF THE DISCLOSURE

Preparation of Grignard reagents by the reaction of certain organic halides and magnesium in a normally liquid hydrocarbon or excess organic halide as reaction medium in the presence of a catalytic amount of certain phosphites, phosphines, formamides or sulfones; conversion of the aforesaid Grignard reagent to an organic tin compound by reaction with tin halides or certain organotin halides and simultaneous reaction of the aforesaid organo halide and magnesium in the aforesaid reaction medium and in the presence of the aforesaid catalysts with tin halide to produce organotin compounds.

---

The present invention relates to a new and novel process for the preparation of organotin compounds as well as a new and novel process for the preparation of Grignard reagents useful as intermediates therein.

This invention specifically concerns the preparation of Grignard reagents by a new and useful method and the preparation of tetraorganotin compounds by the use of Grignard reagents prepared by this method. The preparation of these Grignard reagents contemplates the use of anhydrous aromatic and aliphatic hydrocarbon solvents, mixtures thereof and excess organic halides as reaction solvents with a catalyst selected from trialkyl phosphines, triphenyl phosphine, tribenzyl phosphine, alkyl diphenyl phosphines, dialkyl phenyl phosphines, trialkyl phosphites, triphenyl phosphite, tribenzyl phosphite, alkyl diphenyl phosphites, dialkyl phenyl phosphites, dialkyl sulfones, diphenyl sulfone, dibenzyl sulfone, alkyl phenyl sulfones, and dialkyl formamides, where said alkyl groups have from 1 to 10 carbon atoms. Particularly the tetraalkyltins are useful as anti-knock agents for gasoline, oil additives, polymerization catalysts, stabilizers and rust inhibiting agents for silicones, transformer oil stabilizers, mothproofing agents, hydrochloric acid scavengers and intermediates in the preparation of other useful organotin compounds. The tetraalkenyltin and tetraalkynyltin compounds prepared by the process of this invention have the same utility as the tetraalkytin compounds as also do tin compounds containing phenyl and benzyl groups. In addition, the tetraalkenyl and tetraalkynyltin compounds can be polymerized to make stabilizers for oil and for plastics which have reduced toxicity and which are not extracted with organic solvents. The process of this invention can be used to prepare tin compounds containing different types of organic groups, for example phenyldipropyl-octenyltin. In this manner the tin compound is tailored to fit the properties desired as for instance, as a stabilizer and rust-inhibiting agent for silicones.

The tetraalkyltin compounds, which are prepared by the process of this invention, can be used to prepare trialkyltin halides by a disproportionation reaction with monoalkyltin trihalide. The trialkyltin halide can then be oxidized to form trialkyltin oxide, a compound of considerable commercial importance. These oxides are used as stabilizers for resins, bactericides, fungicides and intermediates for the preparation of anthelmintic agents.

There are several methods now in use for the preparation of tetraalkyltin compounds. These processes suffer either from high cost, low yield or limited applicability. Such processes are (1) the reaction of an alkyl halide with a magnesium-tin alloy to obtain tetraalkyltin, which is limited to the preparation of tetraethyltin; (2) the reaction of tin-sodium alloy with alkyl halide which yields a mixture of alkyltins with a low conversion of tin; (3) the reaction of tin tetrahalides with alkyl halides and sodium metal which provides low yields of a mixture of alkyltin compounds, and (4) the reaction of tin tetrahalides with Grignard reagents to provide tetraalkyltin compounds.

The most widely used process at the present time involves the preparation of tetraalkyltin by the Grignard process. This process consists ordinarily in reacting stannic chloride with an alkyl magnesium chloride such as butyl magnesium chloride to form tetrabutyltin. The Grignard process has several serious disadvantages. It is laborious and time-consuming and limited to small-scale runs because the reaction is difficult to control on a large scale. In addition, the process utilizes anhydrous ethyl ether as a solvent. This solvent is expensive to buy, to dehydrate and both expensive and dangerous to recover. Its use, therefore, increases the overall cost of the tetraalkyltin compounds.

This invention concerns a process for making organotin compounds of the formula $R_4Sn$ which comprises reacting a stoichiometric amount of RX, wherein R is selected from the group consisting of alkyl, alkenyl and alkynyl having from 1 to 18 carbon atoms, phenyl and benzyl and X is selected from the group consisting of chlorine, bromine nad iodine with a stoichiometric amount of magnesium and a stoichiometric amount of $SnX_4$ wherein X is as aforesaid in the presence of a catalytic amount of a member of the group of catalysts described above in an anhydrous solvent selected from those described above.

It will be obvious to one skilled in the chemical art, that the uses of this invention, heretofore described in relation to the preparation of organotin compounds, can also be used to advantage in the preparation and use of Grignard reagents and applied to those reactions which use Grignard reagents to make useful products and intermediates. Grignard reagents, which are organomagnesium compounds of the type RMgX, where X is a halogen, are used to prepare organic acids from alkyl chlorides, magnesium and carbon dioxide. On acid hydrolysis, an organic acid is produced containing one more carbon atom than the alkyl chloride. Grignard reagents are also used to prepare hydrocarbons. For example, methylmagnesium iodide reacts with ethyl iodide to yield propane. Grignard reagents react with aldehydes and produce, on hydrolysis, alcohols. Formaldehyde, for example, reacts with ethylmagnesium iodide to produce n-propyl alcohol. Propionaldehyde and ethylmagnesium iodide react to produce pentanol-3, a secondary alcohol. Tertiary alcohols are derived from the reaction of ketones and Grignard reagents. For example, acetone and methylmagnesium iodide give tertiary butyl alcohol.

Acid halides react with Grignard reagents to produce ketones which in turn react with a second mole of Grignard reagent to yield tertiary alcohols.

In the aromatic series, phenylmagnesium bromide is reacted with ethylene oxide to produce 2-phenylethyl alcohol, a substance widely used in perfumery. Aromatic tertiary alcohols are produced by the reaction of benzophenone with phenylmagnesium bromide.

Benzaldehyde and ethylmagnesium bromide produce, on acid hydrolysis, the secodary alcohol, ethylphenylcarbinol. Benzoic acid is produced by the reaction of phenylmagnesium bromide and carbon dioxide.

In connection with a more detailed consideration of this invention, particularly as it relates to the preparation of Grignard reagents, a molar amount of anhydrous RX, where R is alkyl, alkenyl, or alkynyl having from 1 to 18 carbon atoms, phenyl or benzyl, is reacted with 1 gram-atom of magnesium. A preferred embodiment of this invention comprises reacting 1 gram-atom of magnesium with each mole of RX and using a 10% excess of RX. While magnesium chips, coarse powder and foil may be used, magnesium turnings are preferred. The reaction proceeds in a normally-liquid anhydrous hydrocarbon solvent, preferably pentane, hexane, heptane, octane, benzene, toluene, xylene or cyclohexane which have been made anhydrous by azeotropic distillation by means of molecular sieves or by any means which are familiar and obvious to those skilled in the art. Other solvents which are useful are commercial mixtures of aliphatic and aromatic hydrocarbons such as the Skellysolves, and other commercial petroleum hydrocarbon fractions. Another solvent is excess RX. When the halide of the reaction is utilized, about 2 moles are used for each gram-atom of magnesium. The amount of hydrocarbon solvent will vary with the size of the reaction and also with the solvent. Between about 50 and 200 milliliters of hydrocarbon solvent are preferred per mole of RX. This volume is found to maintain a fluid reaction mixture. The solvent, the magnesium and RX are mixed at room temperature with a catalyst selected from the aforesaid group. While all of the RX may be added at this time, a lesser amount is preferred to initiate the reaction and to aid in controlling the reaction. Preferably from about 5 to about 20% of the RX is initially added. The amount of catalyst is preferably from about 0.1 to 10% by weight of the RX used in the reaction. It will be appreciated by those skilled in the art that higher levels can be used. However, catalytic amounts as described are to be preferred from an economic standpoint. The reaction mixture in the preferred procedure is heated to initiate the reaction and then the remaining RX is added. The reaction is run at a temperature up to the reflux temperature of the reaction mixture and preferably above 0° C. The reaction temperature depends on the organohalide used in the reaction. Alkyl halides usually react at room temperature and do not ordinarily require external heating to initiate the reaction. Unsaturated aliphatic halides, such as allyl bromide and propargyl bromide, are particularly reactive and do not require external heating to initiate the reaction. The reaction time is generally from about 1 to 20 hours and preferably from 1 to 6 hours in gram-molar size runs. During the reaction, further quantities of solvent may be added to maintain fluidity. From about 50 to 600 milliliters of total solvent is effective in gram-molar size runs. At the end of the reaction period, the mixture is preferably cooled to from about 20 to 35° C. if elevated temperatures have been employed during the reaction.

The solution of the Grignard reagent can be reacted with an organohalide which forms a longer chain organic hydrocarbon on hydrolysis. The Grignard reagent can also be reacted with an aldehyde to form a longer chain alcohol; with an acyl halide to form a ketone, and with ethylene oxide to form an alcohol. The compounds which are reacted with Grignard reagents to form useful products are well known to those skilled in the art. These reactions can be performed to advantage by the use of Grignard reagents prepared by the process of this invention.

The Grignard reagents, prepared as described, can be used to prepare tetraorganotin compounds from monoorganotin trihalides, diorganotin dihalides, triorganotin monohalides or from tin tetrahalides according to one of the following equations:

$$RSnX_3 + 3RMgX \rightarrow R_4Sn + 3MgX_2$$
$$R_2SnX_2 + 2RMgX \rightarrow R_4Sn + 2MgX_2$$
$$R_3SnX + RMgX \rightarrow R_4Sn + MgX_2$$
$$SnX_4 + 4RMgX \rightarrow R_4Sn + 4MgX_2$$

wherein R is selected from alkyl, alkenyl, alkynyl having from 1 to 18 carbon atoms, phenyl and benzyl; X is chlorine, bromine and iodine.

The tetraorganotin compounds can also be prepared with the Grignard reagents of this invention and any combination of the organotin halides and tin tetrahalide when their combined components consists of 1 gram-atom of halogen, 1 mole of organic groups and ½ gram-atom of tin for each mole of Grignard reagent:

$$RSnX_3 + R_3SnX + R_2SnX_2 + 6RMgX \rightarrow 3R_4Sn + 6MgX_2$$

The process of this invention can also be used to prepare tetraorganotin compounds containing different organic groups. Dipropyl-octenyl-octadecynyltin is prepared by reacting 2 moles of n-propyl bromide, 1 mole of 1-bromo-4-octene and 1 mole of 1-bromo-9-octadecyne with four moles of magnesium, 1 mole of stannic bromide and a catalyst and solvent as hereinbefore described for the peparation of Grignard reagent. The reaction proceeds according to the following equation:

$$2n\text{-}C_3H_7Br + C_8H_{15}Br + C_{18}H_{33}Br\ 4Mg + SnBr_4 \rightarrow$$
$$4MgBr_2 + di(n\text{-}C_3H_7)(C_8H_5)(C_{18}H_{33})Sn$$

It will be obvious to those skilled in the art that the process described for the preparation of tetraorganotin containing different organic groups is a useful modification of the Grignard process described earlier. In connection with a more detailed description of the Grignard process of this invention, as it relates to a one-step method for the preparation of tetraorganotin compounds, the organohalide, magnesium, catalyst, solvent and tin tetrahalide are reacted together to form the tetraorganotin compound. The process can be extended to a two-step method whereby the organohalide, magnesium, catalyst and solvent are reacted to form the Grignard reagent, as previously described, followed by the addition of a mono-, di or triorganotin halide or a tetrahalotin to form the tetraorganotin product.

In connection with a more detailed description of the two-step procedure for preparing tetraorganotin, Grignard reagent is prepared as previously described in detail, and for each mole of Grignard reagent in the cooled solution is added ¼ mole of $SnX_4$, ½ mole of $R_2SnX_2$, ⅓ mole of $RSnX_3$ or 1 mole of $R_3SnX$ where R and X are as heretofore described. While the catalyst used to prepare the Grignard reagent is not essential for the later reaction, it is most convenient to avoid removal thereof and conduct this reaction in the presence of the aforesaid catalyst. The reaction is exothermic and the temperature at which it is conducted is not critical. Usually, the mixture is heated slowly to initiate the reaction and then heated to a temperature up to the reflux temperature of the mixture. The reflux temperature depends on the boiling point of the solvent. If the solvent is hexane, the reaction will reflux at about 70° C. Xylene, on the other hand, refluxes at about 110° C. Particular care should be exercised in reacting aliphatic unsaturated Grignard reagents such as allylmagnesium halides or propargylmagnesium halides since this type of compound is very reactive. The reaction time is usually from about 1 to 6 hours and preferably about 3 hours for gram-molar size runs. At the end of the reaction period the mixture is cooled to about room temperature. The organic layer is separated from the aqueous layer, vacuum stripped of solvent and distilled to yield the tetraorganotin product.

A specific embodiment of the process of this invention as it applies to a one-step method for preparing tetraorganotin compounds consists in reacting 1 gram-atom of magnesium, preferably in the form of turnings to a molar amount of an organic halide, RX, where R is selected from the group comprising alkyl, alkenyl, alkynyl having from 1 to 18 carbon atoms, phenyl and benzyl, and X is chlorine, bromine and iodine. To the mixture is added a normally-liquid anhydrous hydrocarbon solvent such as hexane, pentane, heptane, benzene, toluene, xylene, cyclohexane or a commercially-available petroleum hydrocarbon fraction such as one of the Skellysolves. Another solvent used to advantage in the process of this invention is excess organo-halide. Preferably an extra mole of RX is used. In addition, when anhydrous hydrocarbons are used as solvents, a 10% excess of RX is to be preferred. The hydrocarbon solvents as well as the organohalides are dehydrated by azeotropic distillation, by the use of molecular sieves or by any one of the methods which are familiar to those skilled in the art. The amount of anhydrous hydrocarbon will depend on the size of the reaction mixture, preferably from about 50 to 600 milliliters per mole of RX. To the reaction mixture containing the magnesium RX and solvent, is added from about 0.1 to 10% of a catalyst selected from trialkyl phosphite, triphenyl phosphite, tribenzyl phosphite, alkyl diphenyl phosphite, dialkyl phenyl phosphite, trialkyl phosphine, triphenyl phosphine, tribenzyl phosphine, alkyl diphenyl phosphine, dialkyl phenyl phosphine, dialkyl formamide, dialkyl sulfone, diphenyl sulfone, dibenzyl sulfone where alkyl has from 1 to 10 carbon atoms. It will be appreciated by those skilled in the art that higher levels can be used. In a preferred procedure only 10% of the required amount of RX is added to the reaction initially. The reaction mixture is heated to reflux to initiate the reaction and the remaining 90% of RX is added with a ¼-molar amount of SnX$_4$, where X is as aforementioned. With some very reactive halides the reaction is spontaneous and external heating is not required to initiate the reaction. With this type of compound the ingredients are carefully added and the reaction is refluxed carefully only after the reaction is essentially complete. The reaction is run at an elevated temperature, and preferably at reflux, for from 1 to 20 hours. The preferred time is from about 1 to 6 hours. The reaction is cooled to from about 20 to 35° C. and quenched with 1 liter of dilute aqueous mineral acid and preferably 10% aqueous hydrochloric acid. The temperature of the reaction mixture is maintained below about 40° C. during the quenching operation. The organic layer is separated from the aqueous layer, vacuum stripped of solvent and distilled to yield the product. The reaction proceeds according to the following equation:

$$4RX + 4Mg + SnX_4 \xrightarrow{cat} R_4Sn + 4MgX_2$$

When aliphatic hydrocarbon solvents are used to fluidize the reaction, a three-phase mixture results. The top layer contains the solvent and organotin product. The intermediate layer consists of the catalyst and the bottom layer is aqueous magnesium halide solution. In the method of the invention which uses excess organo halide as solvent, the bottom layer of the crude product mixture contains the product, catalyst and organo halide. The top layer contains the aqueous magnesium halide soluiton.

The following examples are provided to illustrate the manner of practicing the present invention. They are, however, not to be considered as limiting the scope thereof in any way. The scope of the invention is set forth in the appended claims.

Example I.—Butylmagnesium bromide

To a three-neck, 5 liter flask equipped with a reflux condenser is added: 48.6 grams magnesium turnings (2 g.-atoms), 100 ml. anhydrous toluene, 27.4 grams butyl bromide (0.2 mole) and 27.4 grams triphenyl phosphite (10 wt. percent of total butyl bromide).

The mixture is heated to reflux to initiate the reaction. As soon as the reaction has been initiated, an additional 246.6 grams (1.8 moles) butyl bromide are added so as to maintain a moderate reaction rate. The reaction is maintained at reflux temperature for 8 hours. Additional toluene is added throughout the reaction cycle to maintain a fluid mass. About 400–500 ml. additional toluene is added. After the reaction is complete, the mixture is cooled to about 30° C.

Valeric acid is prepared from the n-butylmagnesium in toluene by adding 100 grams of fresh Dry Ice. The mixture is allowed to stir 30 minutes and one liter of 10% aqueous hydrochloric acid is added. The aqueous layer is separated and the organic layer, adjusted to pH 7–8, is washed with two equal volumes of 10% aqueous sodium bicarbonate solution. This aqueous layer is acidified with 10% dilute hydrochloric acid to pH 1–2 and extracted with two equal volumes of methyl isobutyl ketone. The ketone is evaporated and the n-valeric acid is titrated with dilute sodium hydroxide. Yield is about 53 grams n-valeric acid or about 25% based on Grignard reagent.

n-Butane is prepared from the butylmagnesium bromide in solution by adding 1 liter 10% aqueous hydrochloric acid at such a rate that the temperature does not rise above 30° C. Normal butane evolution from the reaction mixture is observed. It is characterized by gas chromatography.

Example II.—Preparation of tetrabutyltin
one-step procedure

To a 5 liter three-neck flask are added 392.7 g. dibutyltin dibromide (1.0 mole), 301.4 g. butyl bromide (2.2 moles, 10% excess) and 27.4 g. triphenyl phosphite 9% on wt. butyl bromide. The material is heated to reflux (100–105° C.) then gradually over a 3 hour period 53.5 gm. of magnesium turnings, 2.2 moles (10% excess) are added and the reaction is then allowed to reflux for an additional 6 hours. An additional 400 g. of butyl bromide is added during the reaction period to maintain a fluid slurry. The mixture is then cooled to 20° C. and hydrolyzed by the addition of 600 ml. of water and 150 ml. of concentrated hydrochloric acid in such a manner that the reaction temperature does not exceed 35° C. The resulting two-phases are then separated. The organic layer containing the organotin compounds and excess butyl bromide is then vacuum stripped of butyl bromide and distilled.

First distillation cut—120° C. to 130° C. at 3 mm. Hg—337.6 grams
Assay: 70% tetrabutyltin, 30% tributyltin bromide
Second distillation cut—130° C. to 135° C. at 3 mm. Hg—17.5 grams
Assay: 10% tetrabutyltin, 40% tributyltin bromide, 40% dibutyltin dibromide
Third distillation cut—130° C. to 135° C. at 1 mm. Hg—5.0 grams
Assay: 2% tetrabutyltin, 40% tributyltin bromide, 20% dibutyltin dibromide
Pot residue: 17.8 grams Example III.—Preparation of tetrabenzyltin
one-step procedure To a 5 liter three-neck flask are added 371.8 grams dibenzyltin dichloride (1.0 mole), 306.4 g. benzyl chloride (2.2 moles, 10% excess) and 3.06 gm. triphenyl phosphite (1% on wt. of benzyl chloride). The material is heated to reflux and then graually over a three hour period 53.5 gms. of magnesium turnings (2.2 moles, 10% excess) are added and the reaction is allowed to reflux for an additional 6 hours. Anhydrous benzene, 600 g., is added during the refluxing to maintain a fluid slurry. The mixture is then cooled to 20° C. and hydrolyzed by the addition of 600 ml. of water and 150 ml. of concentrated hydrochloric acid in such a manner that the reaction temperature does not exceed 35° C. The resulting two phases are separated. The top layer, which contains the organotin, is vacuum stripped of benzene. The resulting product contains 80 wt. per cent tetrabenzyltin.

Example IV.—Preparation of tetrabutyltin
one-step procedure

To a 5 liter three-neck flask are added 392.7 g. dibutyltin dibromide (1.0 mole), 301.4 g. butyl bromide (2.2 moles, 10% excess) and 27.4 g. triphenyl phosphite (9% on weight of butyl bromide). The material is heated to reflux (100–105° C.) then gradually over a three hour period, 53.5 mgs. of magnesium turnings (2.2 moles, 10% excess) are added and the reaction is allowed to reflux for an additional 6 hours. Anhydrous cyclohexane, 400 g., is added to maintain a fluid slurry during the refluxing. The reaction mixture is cooled to 20° C. and hydrolyzed by the addition of 600 ml. of water and 150 ml. of concentrated hydrochloric acid in such a manner that the reaction temperature does not exceed 35° C. The resulting three phases are separated. The top layer, containing the solvent and the organotin, is vacuum stripped of cyclohexane and contains 360.1 g. of organotin compounds of which 268.4 g. is tetrabutyltin.

Example V.—Preparation of dipropyl-octenyl-octadecynyltin one-step procedure

Compounds containing three different hydrocarbon moieties on tetravalent tin are prepared according to the procedure of Example IV. Dipropyl-octenyl-octadecynyltin is prepared by charging 5 wt. percent of a mixture of 246 grams n-propyl bromide, 191 grams 1-bromooctene-4 and 301 grams 1-bromooctadecyne-9 into a 3-neck, 5-liter flask and adding a mixture of 7.4 grams triphenyl phosphite, 100 ml. anhydrous hexane, 97.2 grams magnesium turnings and 260 grams stannic chloride. The mixture is heated to reflux and the remaining 95% of the organo-halides mixture is added to maintain a moderate reflux. About 300 ml. of additional anhydrous hexane is added during 8 hours of reflux to maintain a fluid slurry. The reaction mixture is cooled to 30° C. and quenched with 1 liter 10% aqueous hydrochloric acid. The reaction mixture is maintained below 40° C. during quenching. The organic layer is separated from the aqueous layer and vacuum stripped of solvent. The product is then distilled at from 200° C. to 270° C. to obtain a dipropyl-octenyl-octadecynyltin fraction.

Example VI.—Preparation of tetraoctyltin one-step procedure

Tetraoctyltin [$(C_8H_{17})_4Sn$] is prepared according to the procedure of Example V with the following materials:

772 grams n-octyl bromide (4 moles)
97.2 grams magnesium turnings (4 g.-atoms)
0.8 grams trimethylphosphite (0.1 wt. percent/alkyl halide)
300 ml. anhydrous toluene
260 g. stannic chloride (1 mole)

Similarly, tetraoctyltin is prepared by utilizing 0.1, 1.0, 10 and 100 wt. percent of the following phosphites:

trimethyl phosphite
trioctyl phosphite
tridecyl phosphite
tribenzyl phosphite
triphenyl phosphite
methyl diphenyl phosphite
diethyl phenyl phosphite
isooctyl diphenyl phosphite
di-isooctyl phenyl phosphite
di-isodecyl phenyl phosphite Example VII.—Preparation of tetrapropargyltin one-step procedure Tetrapropargyltin [$(C_3H_3)_4Sn$] is prepared by the procedure of Example V using the following materials:

476 grams propargyl bromide (4 moles)
97.2 grams magnesium powder (4 g.-atoms)
0.5 grams trimethyl phosphine (0.1 wt. percent/halide)
300 ml. anhydrous n-pentane
260 grams stannic chloride (1 mole)

The propargyl bromide is added cautiously to the other ingredients at room temperature at such a rate that the temperature does not rise above 30° C. The reaction is spontaneous and is refluxed only after the initial reaction is complete.

Similar preparations are made with 0.1, 1.0, 10 and 100 wt. percent of the following phosphines:

trimethyl phosphine
trioctyl phosphine
tridecyl phosphine
triphenyl phosphine
tribenzyl phosphine
methyl diphenyl phosphine
diethyl phenyl phosphine
isooctyl diphenyl phosphine
di-isooctyl phenyl phosphine
di-isodecyl phenyl phosphine Example VIII.—Preparation of tetraoctyltin one-step procedure Tetraoctyltin [$(CH_8H_{17})_4Sn$] is prepared according to the procedure of Example V with the following materials:

960 grams n-octyl iodide (4 moles)
97.2 grams magnesium turnings (4 g.-atoms)
0.8 gram triphenyl phosphine (0.1 wt. percent alkyl halide)
300 ml. anhydrous n-hexane
260 grams stannic chloride (1 mole)

Similar preparations are made with 1 wt. percent, 10 wt. percent and 100 wt. percent of triphenyl phosphine; 0.1 wt. percent, 1 wt. percent, 10 wt. percent and 100 wt. percent of methyl phenyl phosphine; 0.1 wt. percent, 1 wt. percent, 10 wt. percent and 100 wt. percent of triphenyl phosphite.

Example IX.—Preparation of tetrabutyltin one-step procedure

Tetrabutyltin [$(C_4H_9)_4Sn$] is prepared according to the procedure of Example V using the following materials:

548 grams n-butyl bromide (4 moles)
97.2 grams magnesium turnings (4 g.-atoms)
0.6 gram dimethyl formamide (0.1 wt. percent alkyl halide)
200 ml. anhydrous toluene
260 grams stannic chloride (1 mole)

Similar preparations are carried out with 1 wt. percent, 10 wt. percent and 100 wt. percent dimethyl formamide; 0.1 wt. percent, 10 wt. percent and 100 wt. percent diethyl formamide, dioctyl formamide, diisooctyl formamide and didecyl formamide.

Example X.—Preparation of tetraallyltin one-step procedure

Tetraallyltin [$(C_3H_5)_4Sn$] is prepared by the procedure of Example VII with the following materials:

484 grams allyl bromide (4 moles)
97.2 grams magnesium turnings (4 g.-atoms)
0.5 gram dimethyl sulfone (0.1 wt. percent alkene halide)
200 ml. anhydrous cyclohexane
260 grams stannic chloride Similar precautions as those observed in Example VII are observed. The reaction is allowed to go to completion at room temperature.

Similarly, tetraallyltin is prepared by utilizing the following sulfur-containing catalysts at 0.1, 1.0, 10 and 100 wt. percent:

dimethyl sulfone
diethyl sulfone
didecyl sulfone
ethyl phenyl sulfone
decyl phenyl sulfone
diphenyl sulfone
dibenzyl sulfone Example XI.—Preparation of tetraoctadecyltin one-step procedure Into a three-neck, 5-liter flask equipped with a reflux condenser, dropping funnel and thermometer are added: 97.2 grams magnesium turnings (4 g.-atoms); 200 ml. n-hexane (previously dried by azeotropic distillation); 61 grams-1-bromo-octadecane (5% of total required) and 61.0 g. triphenyl phosphite (5% on weight of total alkyl halide). The mixture is heated to reflux to initiate the reaction. There is added immediately 1159 grams 1-bromo-octadecane and 250 grams stannic chloride at such a rate to maintain moderate reflux. After refluxing four hours, the reaction mixture temperature is reduced to 40° C. and quenched with 1 liter 10% aqueous hydrochloric acid. The organic layer is separated and the product is recovered by distillation at 250 to 270° C.

Example XII.—Preparation of tetrapropyltin one-step procedure

Into a three-neck, 5-liter flask equipped with a reflux condenser, dropping funnel and thermometer are added: 97.2 grams magnesium turnings (4 g.-atoms); 200 ml. anhydrous n-pentane; 14.8 grams triphenyl phosphine (0.03 wt. percent of total alkyl halide) and 25 grams n-propyl bromide. The mixture is heated to reflux to initiate the reaction and 457 grams of additional n-propyl bromide and 260 grams stannic chloride are added. The reaction mixture is maintained at a slow reflux for 6 hours. About 200 ml. anhydrous n-pentane are added during the reaction period to maintain a fluid mass. After 6 hours, the reaction mixture is cooled to 25° C. and quenched with 1 liter 10% aqueous hydrochloric acid added at a rate which maintains the temperature of the reaction below 40° C. The organic layer is separated from the aqueous layer and vacuum stripped of solvent. The pure tetrapropyltin is distilled from the crude product mixture by distillation from 100° C. to 115° C. at 10 mm. Hg.

Example XIII.—Preparation of tetrapropargyltin one-step procedure

Tetrapropargyltin [$(C_3H_3)_4Sn$] is prepared according to the procedure of Example VII using:

476.0 grams propargyl bromide (4 moles)
97.2 grams magnesium turnings (4 g.-atoms)
4.8 grams triphenyl phosphite (1 wt. percent alkenyl halide)
300 ml. anhydrous toluene
260 grams stannic chloride Example XIV.—Preparation of tetraoctadecenyltin one-step procedure Tetraoctadecenyltin [$(C_{18}H_{35})_4Sn$] is prepared according to the procedure of Example VII using:

1212 grams 1-bromo-9-octadecene (4 moles)
97.2 grams magnesium turnings (4 g.-atoms)
6.1 grams triphenyl phosphine (5 wt. percent alkenyl halide)
400 ml. anhydrous benzene
260 grams stannic chloride Example XV.—Preparation of tetraoctadecynyltin one-step procedure Tetraoctadecynyltin [$(C_{18}H_{33})_4Sn$] is prepared according to the procedure of Example VII with the following materials:

1204 grams 1-bromo-9-octadecyne (4 moles)
97.2 grams magnesium turnings (4 g.-atoms)
6.0 grams triphenyl phosphine (5 wt. percent/alkynyl halide)
300 grams anhydrous cyclohexane
260 grams stannic chloride Example XVI.—Preparation of tetraoctenyltin one-step procedure Tetraoctenyltin [$(C_8H_{15})Sn$] is prepared according to the procedure of Example VII with the following material:

764 grams 1-bromo-4-octene
97.2 grams magnesium turnings (4 g.-atoms)
0.4 grams triphenyl phosphite (0.5 wt. percent/alkenyl halide)
300 grams anhydrous pentane
260 grams stannic chloride Example XVII.—Preparation of tetrabutyltin two-step procedure To a three-nick, 5-liter flask equipped with a reflux condenser, dropping funnel and thermometer is added:

48.6 grams magnesium turnings (2 g.-atoms)
100 ml. toluene (anhydrous)
27.4 grams n-butyl bromide (0.2 mole)
27.4 grams triphenyl phosphite The mixture is heated to reflux and immediately charged with 246.6 grams n-butyl bromide in such manner as to maintain a moderate reaction rate. Anhydrous toluene (200 ml.) are added during 8 hours refluxing to maintain a fluid slurry. The reaction mixture is cooled to 25° C. after the refluxing period. The mixture contains about 2 moles n-$C_4H_9$-Mg-Br.

To the reaction vessel containing 2 moles of butylmagnesium bromide, is added slowing 219.2 grams stannic bromide (0.5 mole). The resulting mixture is refluxed an additional four hours and is then cooled to 35° C. The reaction is quenched with 1 liter 10% aqueous hydrochloric acid. The temperature is maintained below 40° C. during the acid addition. The organic layer is separated from the aqueous layer, vacuum stripped of solvent and distilled from 155° C. to 160° C. at 10 mm. Hg to obtain tetrabutyltin.

Example XVIII.—Preparation of tetrabutyltin two-step procedure

To the reaction flask containing 2 moles of butylmagnesium bromide, prepared in Example XVII, is added 277.04 grams (⅔ mole) butyltin tribromide. The reaction is carried out according to the procedure of Example XVII and yields about ⅔ mole of tetrabutylin.

Example XIX.—Preparation of tetrabutyltin two-step procedure

To the reaction flask containing 2 moles of butylmagnesium bromide, prepared in Example XVII is added 739.9 grams (2 moles) tributyltin bromide. The reaction is carried out according to the procedure of Example XVII and yields about 2 moles tetrabutyltin.

Example XX.—Preparation of tetrabutyltin two-step procedure

In a manner similar to Examples XVII, XVIII and XIX, one-third mole each of butyltin tribromide (138.8 grams), dibutyltin dibromide (130.9 grams), and tributyltin bromide (123.3 grams) are added to the 2 moles of butylmagnesium bromide prepared in Example XVII. The reaction is carried out as in Example XVII and yields about one more of tetrabutyltin.

Example XXI.—Preparation of tetrabutyltin two-step procedure

In a manner similar to Example XX, a mixture of butyltin tribromide, dibutyltin dibromide, tributyltin bromide and tetrabutyltin whose combined content is ½ gram-atom tin, 1 gram-atom bromine and 1 gram mole of butyl groups are added to a Grignard reagent prepared as in Example XVII and containing one mole of butylmagnesium bromide. The reaction, when carried out according to the procedure of Example XVII, contains about 219 grams of tetrabutyltin.

Example XXII

The reactants and catalysts of Examples I to XVI are reacted in accordance with the two-step procedure illustrated in Examples XVII to XXI employing the same amounts of reactants and temperature conditions of the one-step procedures to obtain products identical therewith.

What is claimed is:

1. A process for making magnesium compounds of the formula RMgX wherein R is selected from the group consisting of alkyl, alkenyl and alkynyl having from 1 to 18 carbon atoms, phenyl and benzyl and X is selected from the group consisting of chlorine, bromine and iodine, said process comprises reacting together stoichiometric amounts of RX, wherein R and X are as aforementioned, and magnesium in the presence of a catalytic amount of a member selected from the group consisting of trialkyl phosphite, triphenyl phosphite, tribenzyl phosphite, alkyl diphenyl phosphite, dialkyl phenyl phosphite, trialkyl phosphine, triphenyl phosphine, tribenzyl phosphine, alkyl diphenyl phosphine, dialkyl phenyl phosphine and dialkyl formamide wherein alkyl has from 1 to 10 carbon atoms in an anhydrous solvent reaction medium selected from the group consisting of normally-liquid hydrocarbons and excess RX wherein R and X are as aforesaid, at a temperature up to the reflux temperature of said reaction mixture.

2. The process of claim 1 wherein the catalyst is a member selected from the group consisting of trialkyl phosphite, triphenyl phosphite, tribenzyl phosphite, alkyl diphenyl phosphite and dialkyl phenyl phosphite wherein alkyl has from 1 to 10 carbon atoms.

3. The process of claim 1 wherein the catalyst is a member selected from the group consisting of trialkyl phosphine, triphenyl phosphine, tribenzyl phosphine, alkyl diphenyl phosphine and dialkyl phenyl phosphine wherein alkyl has from 1 to 10 carbon atoms.

4. The process of claim 1 wherein the catalyst is dialkyl formamide wherein alkyl has from 1 to 10 carbon atoms.

5. The process of claim 1 wherein the solvent is a normally-liquid anhydrous hydrocarbon solvent.

6. The process of claim 1 wherein the solvent is excess RX.

References Cited

UNITED STATES PATENTS

| | | | |
|---|---|---|---|
| 2,795,628 | 6/1957 | Ramsden | 260—665 |
| 2,881,225 | 4/1959 | Kaiser et al. | 260—665 |

OTHER REFERENCES

Hepworth: J. Chemical Society, vol. 119 (1921), pp. 1249–1256.

TOBIAS E. LEVOW, *Primary Examiner.*

A. P. DEMERS, *Assistant Examiner.*

U.S. Cl. X.R.

260—429.7, 999